(12) United States Patent
Tseretopoulos et al.

(10) Patent No.: US 10,698,902 B2
(45) Date of Patent: Jun. 30, 2020

(54) DATA MANAGEMENT DEVICE, COMMUNICATION SYSTEM AND METHODS FOR TAGGING DATA IN A DATA TABLE AND TRIGGERING AUTOMATED ACTIONS

(71) Applicant: The Toronto-Dominion Bank, Toronto (CA)

(72) Inventors: Dean C. N. Tseretopoulos, Toronto (CA); Robert Alexander McCarter, Eden (CA); Sarabjit Singh Walia, Demarest, NJ (US); Vipul Kishore Lalka, Oakville (CA); Nadia Moretti, Toronto (CA); Paige Elyse Dickie, Toronto (CA); Denny Devasia Kuruvilla, Toronto (CA); Milos Dunjic, Oakville (CA); Dino Paul D'Agostino, Richmond Hill (CA); Arun Victor Jagga, Toronto (CA); John Jong-Suk Lee, Toronto (CA); Rakesh Thomas Jethwa, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 289 days.

(21) Appl. No.: 15/724,535

(22) Filed: Oct. 4, 2017

(65) Prior Publication Data
US 2019/0102392 A1 Apr. 4, 2019

(51) Int. Cl.
*G06F 16/00* (2019.01)
*G06F 16/2455* (2019.01)
(Continued)

(52) U.S. Cl.
CPC .... *G06F 16/24565* (2019.01); *G06F 16/2365* (2019.01); *G06F 16/2379* (2019.01); *G06F 16/5866* (2019.01); *G06Q 30/04* (2013.01)

(58) Field of Classification Search
CPC .................................................. G06F 16/5866
See application file for complete search history.

(56) References Cited

U.S. PATENT DOCUMENTS

| 5,903,881 A | 5/1999 | Schrader et al. |
| 8,438,295 B2 | 5/2013 | Shukla et al. |

(Continued)

FOREIGN PATENT DOCUMENTS

WO WO2016075530 A1 5/2016

OTHER PUBLICATIONS

Unknown author, IFTTT, Wikipedia, at least as early as Sep. 8, 2017, https://en.wikipedia.org/wiki/IFTTT 9/.

*Primary Examiner* — Ajith Jacob
(74) *Attorney, Agent, or Firm* — Ridout and Maybee LLP

(57) ABSTRACT

A data management device, communication system and methods for tagging data in a data table and triggering automated action. A data management device receives from a first data provider one or more records of a data table, each record comprising a plurality of fields. The data table is associated with an account having one or more authorized users. The plurality of fields each has a value set by the first data provider. The data manger determines one or more tags for the one or more records in accordance with a plurality of autotagging rules. The autotagging rules include heuristic rules learned from user behavior and based on one or more of the plurality of fields of the record. The data manger appends the one or more records to include one or more tag fields corresponding to the one or more tags for the one or more records. The appended records are stored in a database. One or more automated actions may be triggered based on one or more tag fields of one or more of the plurality of records.

21 Claims, 7 Drawing Sheets

(51) Int. Cl.
    *G06F 16/23*     (2019.01)
    *G06Q 30/04*     (2012.01)
    *G06F 16/58*     (2019.01)

(56) References Cited

U.S. PATENT DOCUMENTS

| | | |
|---|---|---|
| 8,611,867 B2 | 12/2013 | Swanburg et al. |
| 8,700,512 B1 | 4/2014 | Kuznetsov |
| 9,063,978 B1 | 6/2015 | Kapoor et al. |
| 9,152,739 B2 | 10/2015 | Aasen et al. |
| 9,449,106 B2 | 9/2016 | Reese et al. |
| 9,449,346 B1 | 9/2016 | Hockey et al. |
| 2014/0156527 A1 | 6/2014 | Grigg et al. |
| 2015/0278276 A1* | 10/2015 | Konik .................. G06F 16/116 707/715 |
| 2015/0324786 A1 | 11/2015 | Desai et al. |
| 2016/0379187 A1 | 12/2016 | Wijngaarden et al. |
| 2017/0031963 A1 | 2/2017 | Merz et al. |

\* cited by examiner

DATA MANAGEMENT DEVICE, COMMUNICATION SYSTEM AND METHODS FOR TAGGING DATA IN A DATA TABLE AND TRIGGERING AUTOMATED ACTIONS

TECHNICAL FIELD

The present disclosure relates to data management, and in particular, to a data management device, communication system and methods for tagging data in a data table and triggering automated actions.

BACKGROUND

Data management devices and systems may aggregate and manage data from a variety of data sources. It is difficult to categorize and process data from disparate data sources when attempting to better use the data managed by and available to data devices and systems. One approach to categorize data is to rely upon predefined categories defined by the data sources and upon data categorization determined by the data sources. This approach leads to suboptimal categorization of data, which limits the usefulness of the categorization and limits the ability to process aggregated data managed by data management devices and systems.

DESCRIPTION OF EXAMPLE EMBODIMENTS

Figure 1:
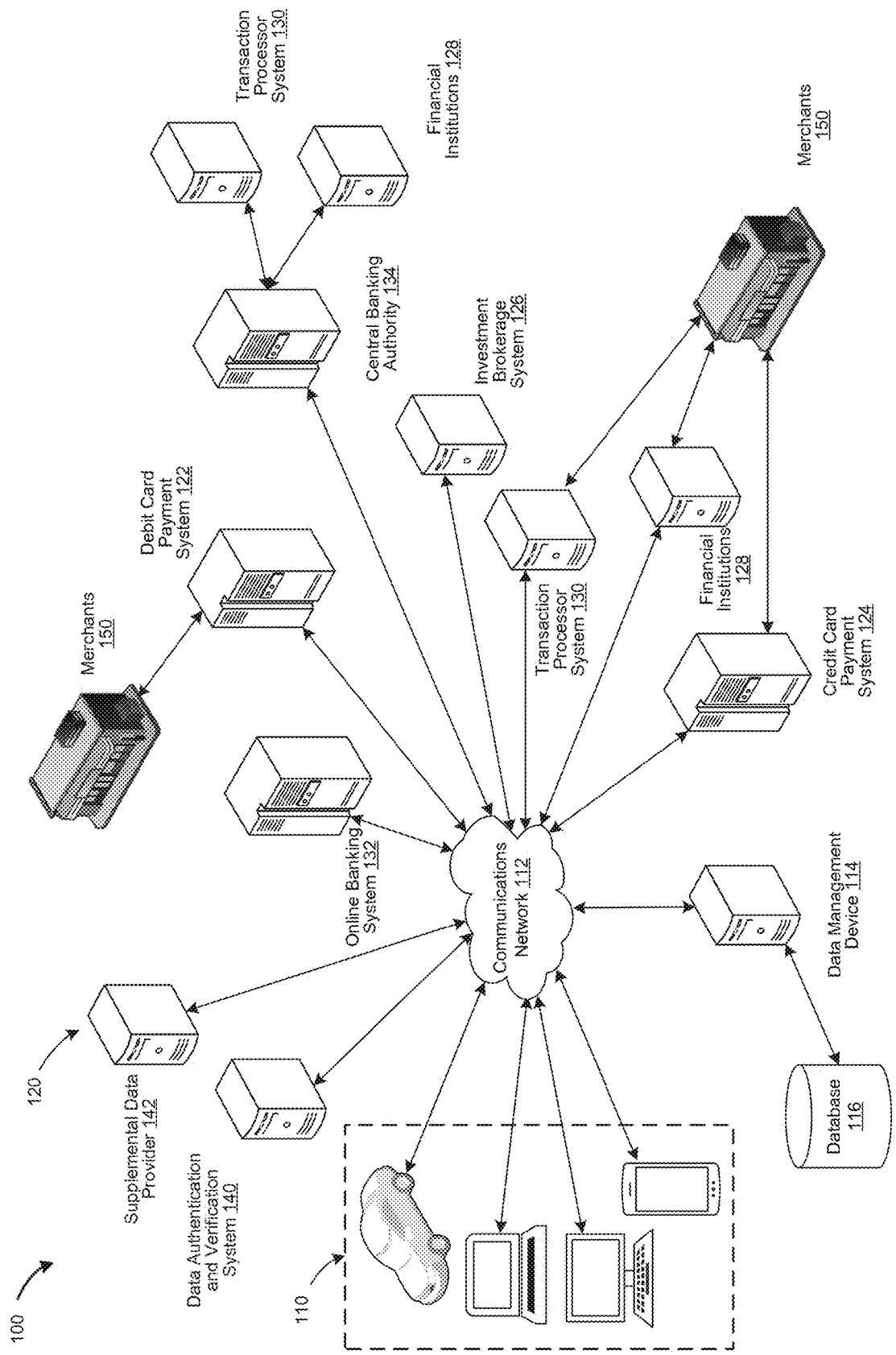
FIG. 1 is a schematic diagram of a communication system in accordance with one example embodiment of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

The present disclosure provides a data management device, communication system and methods for automatically tagging data in a data table and optionally triggering automated actions. Data is automatically tagged based using data of the data records and predetermined rules. The rules may be heuristic rules learned from user behavior or may be defined by a user. The autotagging rules that are applied are selected by the user, typically in advance, i.e. the rules learned from user behavior or defined by the user that are applied are selected by the user, allowing the user to enable and disable rules as desired, regardless of whether the rule was learned or user-defined. This provides customization of data categorization which may be more personalized and more precise than alternate approaches such as those which relate on data categorization by data source providers, thereby improving the categorization of data. This allows greater utility in terms of provide users with useful information and in terms of creating opportunities for further data processing. For example, with a more precise method of data categorization, data may be automatically (i.e., without user input) tagged at the data record level based on a customized, user-defined data categorization scheme, and these tags may be used to automatically trigger automated actions (i.e., without user input) based on rules that may be pre-authorized by a user. For example, when the data records relate to financial records, the automated actions may include bill payments, portfolio rebalancing, or the initiation or termination/cancellation of other financial transactions. The automated actions may include determining whether to authorize and/or settle a financial transaction, such as a credit card transaction or debit card transaction. The automated actions are automated tasks or actions that may otherwise involve user decision making to select and user action to perform, which increases the likelihood of user error and increases user involvement.

In accordance with a first aspect of the present disclosure, there is provided a data management device. The data management device comprises a processor and a memory coupled to the processor. The processor has stored hereon instructions that, when executed by the processor, cause the data management device to perform methods described herein. In particular, in the first aspect, the data management device receives from a first data provider one or more records of a data table, each record comprising a plurality of fields. The data table is associated with an account having one or more authorized users. The plurality of fields each has a value set by the first data provider. The data manger determines one or more tags for the one or more records in accordance with a plurality of autotagging rules. The autotagging rules include heuristic rules learned from user behavior and based on one or more of the plurality of fields of the record. The data manger appends the one or more records to include one or more tag fields corresponding to the one or more tags for the one or more records. The appended records are stored in a database. One or more automated actions may be triggered based on one or more tag fields of one or more of the plurality of records.

In accordance with a second aspect of the present disclosure, there is provided a data management device. The data management device comprises a processor and a memory coupled to the processor. The processor has stored hereon instructions that, when executed by the processor, cause the data management device to perform methods described herein. In particular, in the first aspect, the data management device detects a trigger based on one or more trigger rules and one or more trigger conditions. The trigger conditions comprise any one or a combination of a value of one or more fields of one or more transaction records in a data table of a database, additional information relating to the one or more transaction records, additional information relating to an account associated with the data table, or other events. One or more automated actions for the detected trigger. The one or more automated actions are performed.

In accordance with another aspect of the present disclosure, there is provided a method of automatically tagging data in a data table by a data management device in a communication network. The data table is associated with an account having one or more authorized users. One or more records of the data table are received from a first data provided. Each record comprises a plurality of fields, wherein the plurality of fields each has a value set by the first data provider. One or more tags for the one or more records are determined by the data management device in accordance with a plurality of autotagging rules. The autotagging rules include heuristic rules learned from user behavior and based on one or more of the plurality of fields of the record. The one or more records are appended by the data management device to include one or more tag fields corresponding to the one or more tags for the one or more records. The appended records are stored by the data management device in a database.

In accordance with a further aspect of the present disclosure, there is provided a method of a data management device for triggering automated actions. The data management device detects a trigger based on one or more trigger rules and one or more trigger conditions. The trigger conditions comprise any one or a combination of a value of one or more fields of one or more transaction records in a data table of a database, additional information relating to the one or more transaction records, additional information relating to an account associated with the data table, or other events. One or more automated actions for the detected trigger. The one or more automated actions are performed.

In accordance with yet further aspects of the present disclosure, there is provided a non-transitory machine readable medium having tangibly stored thereon executable instructions for execution by a processor of a device, such as a data management device. The executable instructions, when executed by the processor, cause the data management device to perform the methods described above and herein.

Example Communication System

Reference is first made to FIG. 1 which shows in schematic block diagram form a communication system 100 in accordance with one example embodiment of the present disclosure. The communication system 100 comprises a plurality of client devices 110 that communicate with a data management device 114 via a communication network 112 such as the Internet. The communication network 112 enables the client devices 110 to exchange data with the data management device 114. The communication network 112 may comprise a plurality of networks of one or more network types coupled via appropriate methods known in the art, including a local area network (LAN), such as a wireless local area network (WLAN) such as Wi-Fi™, a wireless personal area network (WPAN), such as Bluetooth™ based WPAN, a wide area network (WAN), a public-switched telephone network (PSTN), or a public-land mobile network (PLMN), also referred to as a wireless wide area network (WWAN) or a cellular network.

The client devices 110 are equipped for one or both of wired and wireless communication. The client devices 110 may be any computing device equipped for communicating over LAN, WLAN, Bluetooth, WAN, PSTN, PLMN, or any combination thereof. For example, the client devices 110 may be fixed (or desktop) personal computers or mobile wireless communication devices. The client devices 110 may communicate securely with the data management device 114 using, for example, Transport Layer Security (TLS) or its predecessor Secure Sockets Layer (SSL). TLS and SSL are cryptographic protocols which provide communication security over the Internet. TLS and SSL encrypt network connections above the transport layer using symmetric cryptography for privacy and a keyed message authentication code for message reliability. Client devices 110 engaged in secure communication using TSL or SSL are provided with encryption key(s), which are typically stored in persistent memory of the respective client devices 110.

Examples of the mobile wireless communication devices include, but are not limited to, handheld wireless communication devices, such as smartphones, tablets, laptop or notebook computers, netbook or ultrabook computers, vehicles having an embedded-wireless communication system, such as a Wi-Fi™ or cellular equipped in-dash infotainment system, or tethered to another wireless communication device having such capabilities. The mobile wireless communication devices may include devices equipped for cellular communication through PLMN or PSTN, mobile devices equipped for Wi-Fi™ communication over WLAN or WAN, or dual-mode devices capable of both cellular and Wi-Fi™ communication. In addition to cellular and Wi-Fi™ communication, the mobile wireless communication devices may also be equipped for Bluetooth™ and/or NFC (near-field communication) communication. In various embodiments, the mobile wireless communication devices are configured to operate in compliance with any one or a combination of a number of wireless protocols, including GSM, GPRS, CDMA, EDGE, UMTS, EvDO, HSPA, 3GPP, or a variety of others. It will be appreciated that the mobile wireless communication devices may roam within and across PLMNs. In some instances, the mobile wireless communication devices are configured to facilitate roaming between PLMNs and WLANs or WANs, and are thus capable of seamlessly transferring sessions from a coupling with a cellular interface to a WLAN or WAN interface, and vice versa. An example client device 110 is described below in connection with FIG. 2.

The data management device 114 may comprise a single computer system and may comprise one or more server modules. The data management device 114 may comprises a mainframe computer comprising a server module or connected to a server computer. The teachings of the present disclosure are flexible and capable of being operated in various different environments without compromising any major functionality. In some embodiments, the system includes multiple components distributed among a plurality of computing devices. One or more components may be in the form of machine-executable instructions embodied in a machine-readable medium. An example data management device 114 is described below in connection with FIG. 3.

The communication system 100 comprises a number of data providers (also known as data sources) 120 that also communicate with the data management device 114. The data providers 120 may include any one or a combination of a debit card payment system 122 such as Electronic funds transfer at point of sale (EFTPOS) or INTERACT™ payment network, a credit card payment system 124 such as the VISA™ or Mastercard™ credit card payment network, an investment brokerage system 126 such as TD Ameritrade™, financial institution 128 such as banks or credit unions, a transaction processor 130 such as a credit card processor and point of sale (POS) provider, such as the Vantiv™ platform (provided by Vantiv, Inc.), an online banking system 132, a data authentication and verification system 140, or a supplemental data provider 142, such as a location service provider or social media network system. The data authentication and verification system 140 may be, for example, the Plaid™ account and transaction verification application programming interface (API) from Plaid Technologies, Inc. or the Yodlee™ account and transaction verification API from Envestnet, Inc.

Merchants 150, e.g. stores or online sellers, may indirectly communicate with the data management device 114, for example, via one or more of the debit card payment system 122, credit card payment system 124, financial institution 128 or transaction processor 130. The debit card payment system 122 and credit card payment system 124 use a set of proprietary communication standards for the exchange of financial transaction data and the settlement of funds between financial institutions (FI) that are part of the debit card payment system 122 and credit card payment system 124, respectively.

Although in the shown embodiment the data management device 114 communicates with the online banking system 132 and other data providers, the online banking system 132 and/or other data providers may be part of the data management device 114 in other embodiments.

The data management device 114 may communicate with a central banking authority 134, such as the Federal Reserve of the United States of America (USA) or Bank of Canada, in addition to, or instead of, communicating directly with financial institutions 128. The central banking authority 134 communicates with a plurality of authorized financial institutions (FIs), known as receiving depository financial institutions (RDFIs) in the USA. An RDFI is a financial institution qualified to receive ACH (Automated Clearing House) entries. These institutions are required by regulation to abide by the NACHA (National Automated Clearing House Association) Rules. In Canada, payments are processed through Canada's Large Value Transfer System (LVTS) and the Automated Clearing Settlement System (ACSS), both of which are owned and operated by Payments Canada, a not-for-profit organization created under the Canadian Payments Association Act.

Access to the data management device 114 is typically to limited registered users 20. Each registered user has a user account stored in a registry stored in a database 116 of the data management device 114. The database 116 may comprise a number of databases, such as an account database and a transaction database. Each user also has unique user credentials, e.g., user identifier (ID) and password or personal identifier number (PIN) for logging into and accessing the data management device 114, for example, via a website or dedicated (standalone) application. Each user has account data stored in the database 116 by the data management device 114, such as financial transaction data.

When the data management device 114 is part of the online banking system 132, the user ID may be a card number of a transaction card. For example, each registered user may be issued a transaction card having a unique number which may be used for the user ID. The term "transaction card" may refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as a handheld wireless communication device, key fobs, and/or computer. Each type of transaction card may be used as a method of payment for performing a transaction.

The data management device 114 may provide a dashboard for interfacing with the data management device 114, which may be provided by a Web browser or a dedicated application. Registered users may use the dashboard to view data, such as financial transaction data, aggregated from one or more of the data providers 120, and to initiate financial transactions such as bill payments, credit card payments, electronic fund transfers, buying or selling of securities, etc. For example, the data management device 114 provides a graphical user interface (GUI) for reviewing their accounts and transaction data of their accounts.

Example Client Device

Figure 2:
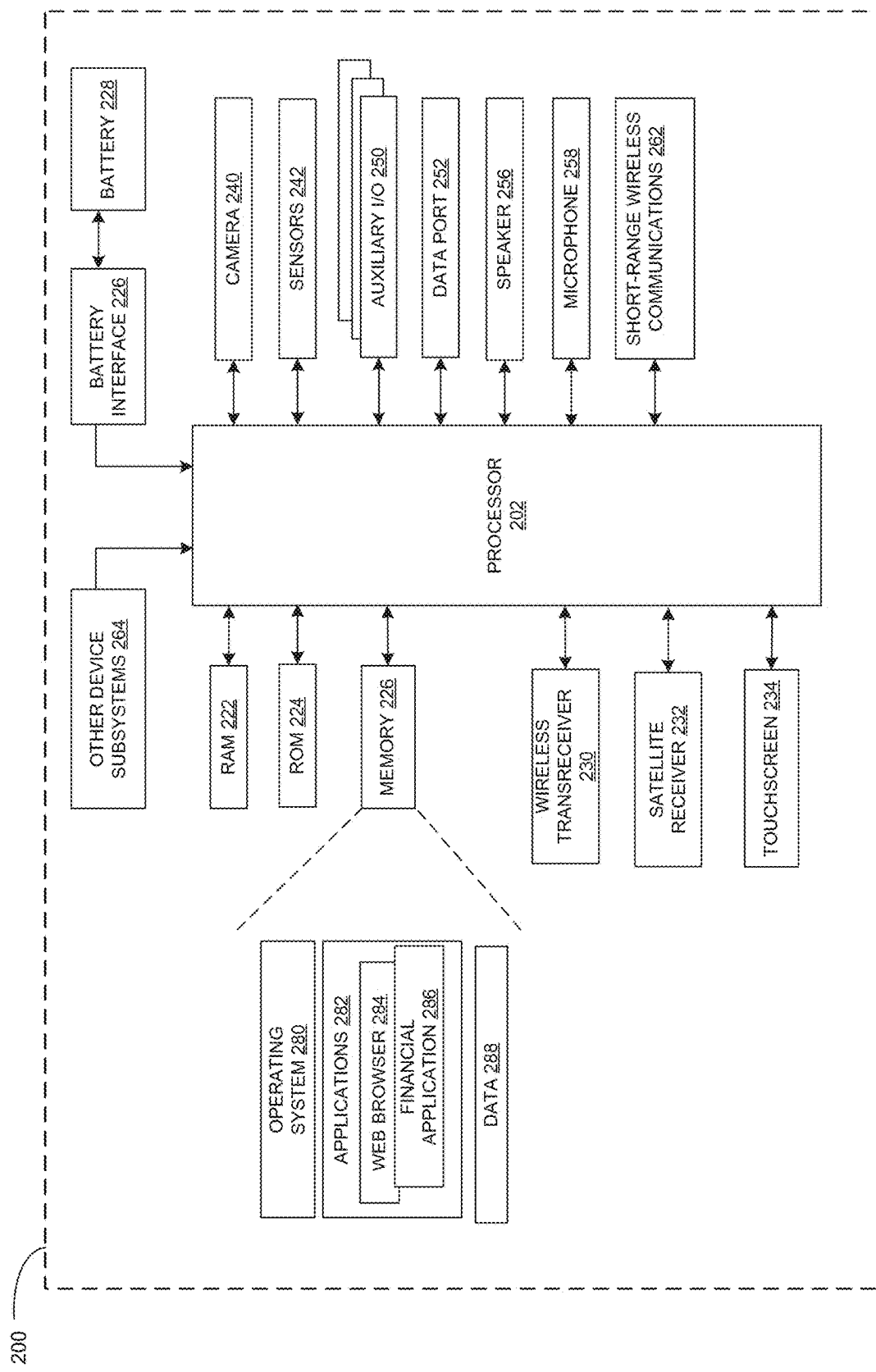
FIG. 2 is a block diagram of a client device suitable for use in the communication system of the present disclosure.

Reference is next made to FIG. 2 which illustrates in simplified block diagram form example mobile wireless communication devices 200 ("mobile device 200") suitable for use in the communication system of the present disclosure. The mobile device 200 includes a controller comprising at least one processor 202 (such as a microprocessor) which controls the overall operation of the mobile device 200. The processor 22 is coupled to a plurality of components via a communication bus (not shown) which provides a communication path between the components and the processor 202.

The processor 202 is coupled to Random Access Memory (RAM) 222, Read Only Memory (ROM) 224, persistent (non-volatile) memory 226 such as flash memory, one or more wireless transceivers 230 for exchanging radio frequency signals with a wireless network that is part of the communication network 112, a satellite receiver 232 for receiving satellite signals from a satellite network 260 that comprises a plurality of satellites which are part of a global or regional satellite navigation system, and a touchscreen 234.

The mobile device 200 also comprises a camera 240, sensors 242, auxiliary input/output (I/O) subsystems 250, data port 252 such as serial data port (e.g., Universal Serial Bus (USB) data port), speaker 256, microphone 258, a short-range communication subsystem 262, and other device subsystems 264. The sensors 242 may comprise any one or a combination of a motion sensor, an orientation sensor, electronic compass, altimeter, or proximity sensor. The mobile device 200 also comprise additional input devices such as buttons, switches, dials, a keyboard or keypad, or navigation tool, depending on the type of mobile device 200, and other additional devices such as a vibrator or light-emitting diode (LED) notification light, depending on the type of mobile device.

The touchscreen 234 comprises a display such as a color liquid crystal display (LCD), light-emitting diode (LED) display or active-matrix organic light-emitting diode (AMOLED) display, with a touch-sensitive input surface or overlay connected to an electronic controller. A graphical user interface (GUI) of the mobile device 200 is rendered and displayed on the touchscreen 234 by the processor 202. A user may interact with the GUI using the touchscreen and optionally other input devices (e.g., buttons, dials) to display relevant information, such as banking or other financial information, etc. The GUI may comprise a series of traversable content specific menus.

The wireless transceivers 230 comprise one or more cellular (RF) transceivers for communicating with a radio access network (e.g., cellular network). The wireless transceivers 230 may communicate with any one of a plurality of fixed transceiver base stations of a cellular network within its geographic coverage area. The wireless transceivers 230 may comprise a multi-band cellular transceiver that supports multiple radio frequency bands. The wireless transceivers 230 may also comprise a WLAN transceiver for communicating with a WLAN via a WLAN access point (AP). The WLAN may comprise a Wi-Fi wireless network which conforms to IEEE 802.11x standards (sometimes referred to as Wi-Fi®) or other communication protocol.

The short-range communication subsystem 262 enables communication between the mobile device 200 and other proximate systems or devices, which need not necessarily be similar devices. The short-range communication subsystem 262 may also include devices, associated circuits and components for providing other types of short-range wireless communication such as Bluetooth™, near field communication (NFC), IEEE 802.15.3a (also referred to as Ultra-Wideband (UWB)), Z-Wave, ZigBee, ANT/ANT+ or infrared (e.g., Infrared Data Association (IrDA) communication).

Operating system software 282 executed by the processor 202 is stored in the persistent memory 226 but may be stored in other types of memory devices, such as ROM 224 or similar storage element. A number of applications 282 executed by the processor 202 are also stored in the persistent memory 226. The applications 282 include a Web browser 284 and a financial application 286. Other applications such as mapping, navigation, media player, telephone and messaging applications, etc. are also stored in the memory 226. The Web browser 284 or financial application 286, when executed by the processor 202, allows the mobile 200 to communicate with the data management device 114 in accordance with the methods described herein. The financial application 286 may be a banking application, such as a mobile banking application, or mobile wallet. Substantially the same functionality as the financial application 286 may be obtained by using the Web browser 284 to access a website of the data management device 114, such as online banking system, in some embodiments.

The memory 226 also stores a variety of data 288. The data 288 may comprise sensor data sensed by the sensors 242, user data 184 comprising user preferences, settings and optionally personal media files (e.g., music, videos, directions, etc.), a download cache comprising data downloaded via the wireless transceivers 230, and saved files. System software, software modules, specific device applications, or parts thereof, may be temporarily loaded into a volatile store, such as RAM 222, which is used for storing runtime data variables and other types of data or information. Communication signals received by the mobile device 200 may also be stored in RAM 222. Although specific functions are described for various types of memory, this is merely one example, and a different assignment of functions to types of memory may be used in other embodiments.

The mobile device 200 may also include a battery 228 as a power source, such as one or more rechargeable batteries that may be charged, for example, through charging circuitry coupled to a battery interface such as the serial data port 252. The battery 228 provides electrical power to at least some of the components of the mobile device 200, and the battery interface 226 provides a mechanical and electrical connection for the battery 228. The battery interface 226 is coupled to a regulator (not shown) which provides power to the circuitry of the mobile device 200.

Data Management Device

Figure 3:
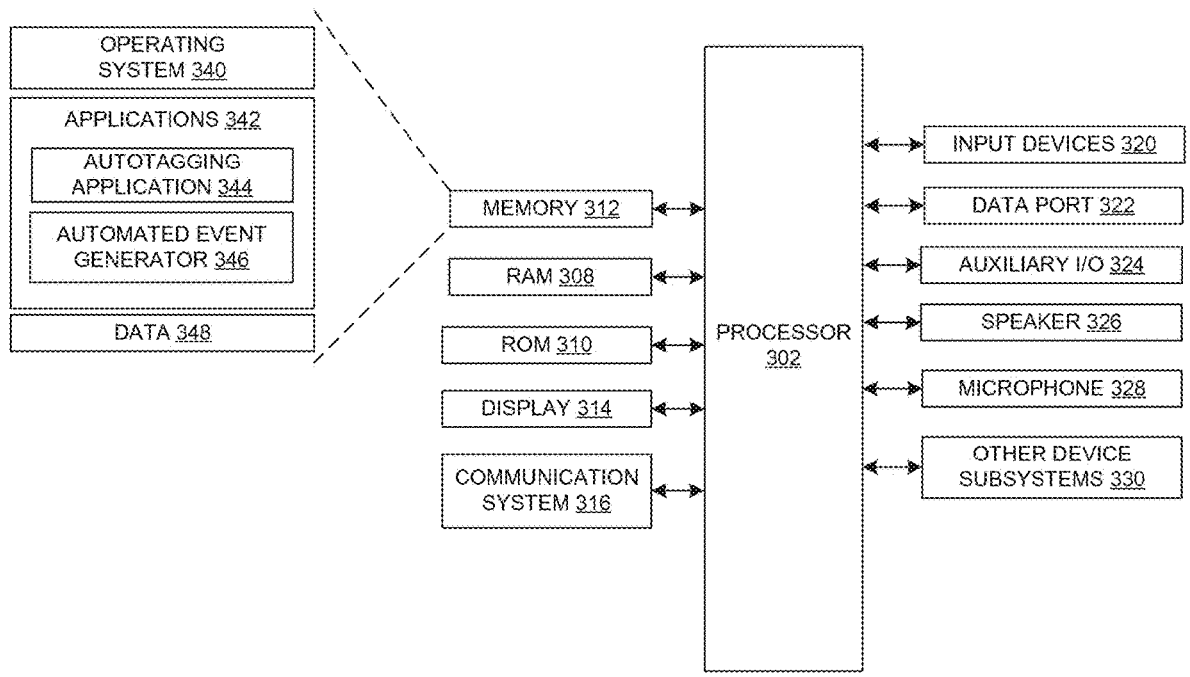
FIG. 3 is a block diagram of a data management device suitable for use in the communication system of the present disclosure.

Reference is next made to FIG. 3 which illustrates in simplified block diagram form an example data management device 114 in accordance with the present disclosure. The device 114 includes a controller comprising at least one processor 302 (such as a microprocessor) which controls the overall operation of the device 114. The processor 302 is coupled to a plurality of components via a communication bus (not shown) which provides a communication path between the components and the processor 302.

The device 114 comprises RAM 308, ROM 310, a persistent memory 312 which may be flash memory or other suitable form of memory, a communication subsystem 316 for wired and/or wireless communication, one or more input device(s) 320, a data port 322 such as a serial data port, auxiliary input/outputs (I/O) 324, and other devices subsystems 330. The input device(s) 320 may include a keyboard or keypad, one or more buttons, one or more switches, a touchpad, a rocker switch, a thumbwheel, or other type of input device. In addition to or instead of a keyboard or keypad, the display 314 may be provided as part of a touchscreen or touch-sensitive display which provides an input device 320. The device 114 may also comprise any one or a combination of a display 314, speaker 326 or microphone 328.

Operating system software 340 executed by the processor 302 is stored in the persistent memory 312 but may be stored in other types of memory devices, such as ROM 310 or similar storage element. The persistent memory 312 includes installed applications 342 and user data, such as saved files, among other data. The processor 302, in addition to its operating system functions, enables execution of software applications 342 on the device 114. The installed applications may include an autotagging application 344 and/or automated action generator 346 that, when executed by the processor 302, causes at least some of the operations of the methods described herein to be performed.

Example Methods

Figure 4:
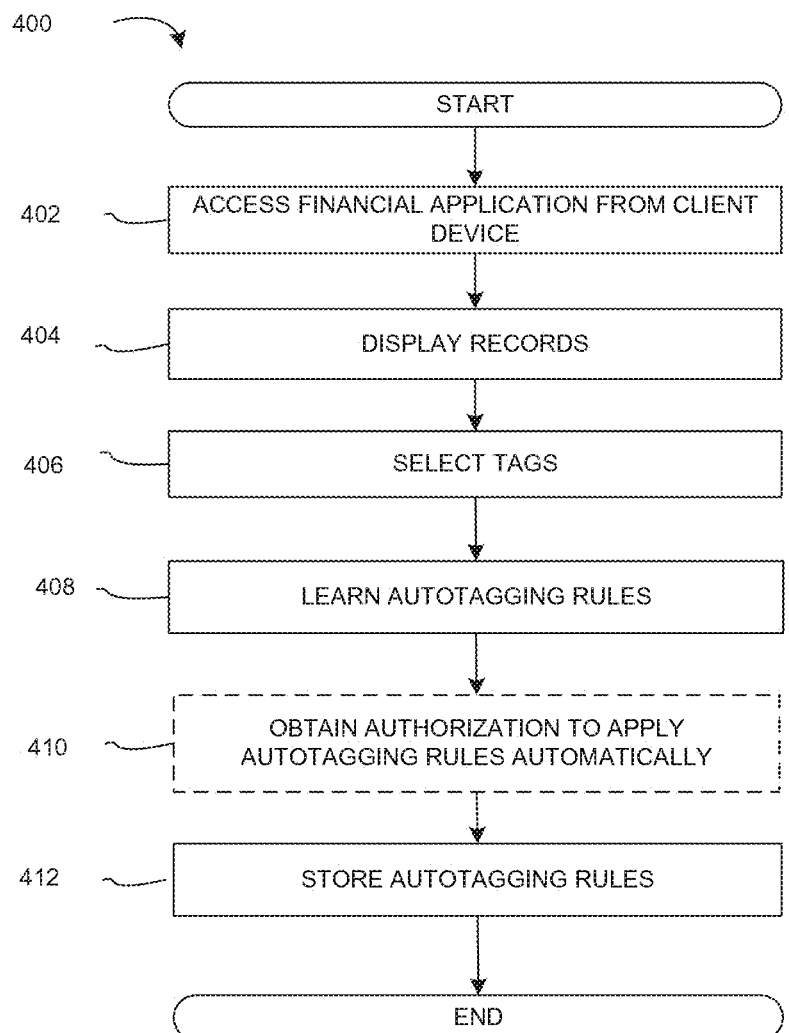
FIG. 4 is a flowchart illustrating an example method of learning autotagging rules in accordance with one example embodiment of the present disclosure.

Referring next to FIG. 4, a method 400 of learning autotagging rules in accordance with one example embodiment of the present disclosure will be described. At operation 402, a user accesses the financial application 286 on the client device 110. This may comprise providing credentials via a GUI to log in to the financial application 286 on the client device 110, which may be a mobile wireless communication device such as a smartphone. The data management device 114, which may be an online banking system 132, attempts to verify the provided user credentials. When the provided user credentials are verified by the data management device 114 after a comparison of the provided user credentials to user account records, the user is granted secure access to the data management device 114 and is logged in to the financial application 286 on the client device 110.

At operation 404, at least portions of one or more records of a data table from the database 116 of the data management device 114 are displayed on the display of the client device 110 (e.g., the touchscreen 234). Each record comprises a plurality of fields. The data table and records are associated with an account of the user. Example account types include a bank account, credit card account, and investment account. The account types may have a sub-type, such as business or personal (e.g., bank account or credit card accounts), chequing or savings (e.g., bank accounts), registered or unregistered (e.g., investment accounts), group or personal (e.g., investment accounts), etc. The account may have more than one authorized user. For example, the account may be a joint bank account or credit card account.

The records of the data table may be based on or derived from records of a data provider 120 such as a debit card payment system 122, credit card payment system 124, investment brokerage system 126, financial institution 128, transaction processor 130 or merchant 150, among other possibilities. For example, when the records related to financial transactions of a bank account, the displayed fields may comprise a date field, a description field, a deposit field, a withdrawal field, and a balance field, which are derived from records for banking transactions such as debit card transactions which may comprise at least two of a date field, a time field, a merchant ID field, an amount field, and a user ID field. As described below, the user ID field may be used for a card number of a corresponding transaction card issued for a user. The card number is linked to, or associated, with an account number of a corresponding account using account mapping information stored by, or provided to, the data management device 114 and/or data provider 120. Similarly, when the records related to financial transactions of a credit card account, the displayed fields may comprise a date field, a description field, a debit field, and a credit field, which are derived from records for credit card transactions which may comprise at least two of a date field, a time field, a merchant ID field, an amount field, and a user ID field.

At operation 406, the user selects one or more tags for one or more records. Multiple tags may be selected for each record. The tags may be hierarchical in nature. There is no limit to the number of tags that the user may select. The user may select from a plurality of predetermined tags presented (or suggested) to the user, the user may define their own custom tags, or a combination thereof. The presented (or suggested) tags may be based on tags the behavior of other users, such as the autotagging rules of other users. When predetermined tags are presented to the user, the predetermined tags may depend on the type of account for example, whether the account is a bank account, credit card account, or investment account, and possibly a sub-type, for example, whether the account is a business or personal account.

The value of the predetermined tags presented to the user may also depend on the data provided by a data provider associated with a respective record, such as the value of a merchant ID field, a transaction type field or transaction description field, location field, or other suitable field. For one example, a tag of "Fast Food" may be suggested (or applied) for a bank account or credit card account when the value of the merchant ID field matches a fast food restaurant (e.g., by name, ID or other suitable means) whereas "Fine Dining" may be suggested when the value of the merchant ID field matches a fine dining restaurant (e.g., by name, ID or other suitable means). For another example, a tag of "Dividend" may be suggested for an investment account when the value of the transaction type field or transaction description field matches a dividend whereas "Purchase" may be suggested when the value of the merchant ID field matches a securities purchase.

Each tag may have one or both of a unique description and a unique visual indication such as flag, marker or other GUI indicator to uniquely identify the tag. For example, a colored flag or marker, or an icon, may be used. The description may be used for a text label displayed in the GUI of the financial application 286.

At operation 408, when a threshold number of tag selections have been made by the user, the data management device 114 generates a plurality of autotagging rules based on the user selections using, for example, a heuristic learning technique. In some examples, the autotagging rules may be learned by a neural network based on user behavior using, for example, reinforcement learning techniques such as Q-learning™. Q-learning™ is a model-free reinforcement learning technique that may be used to find an optimal action-selection policy for any given (finite) Markov decision process (MDP) and is based on learning an action-value function. Using Q-learning™, an action-value function that automatically determines a tag for a record based on the values of one or more fields of the record may be learned for a particular user and for each account type held by the particular user. The behavior of other users, such as the autotagging rules of other users, may be used as a target in the learning process. Alternatively, the user may define autotagging rules manually by specified the value of one or more fields of the record and the corresponding tag to be assigned. The data management device 114 may suggest autotagging rules based on the autotagging rules of other users from which the user may select one or more autotagging rules.

At operation 410, the data management device 114 may optionally obtain authorization from the user to automatically apply the autotagging rules when new records are received from data providers 120.

At operation 412, the autotagging rules are stored by the data management device 114 on a per user basis.

Figure 5:
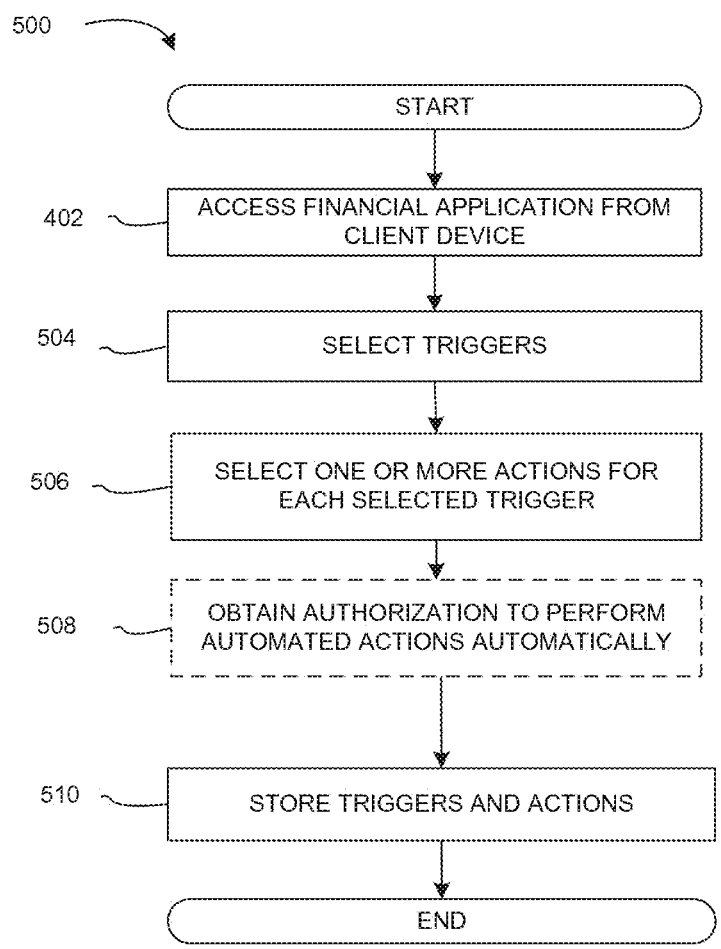
FIG. 5 is a flowchart illustrating an example method of configuring triggers for automated actions in accordance with one example embodiment of the present disclosure.

Referring next to FIG. 5, a method 500 of configuring triggers for automated actions based on a financial transaction in accordance with one example embodiment of the present disclosure will be described. At operation 402, a user accesses the financial application 286 on the client device 110.

At operation 504, the user is presented via the GUI of the financial application 286 with a plurality of suggested triggers for triggering one or more automated actions. The triggers may be obtained from a trigger store provided by the financial application 286. Triggers may be free or may require payment by the user. The data management device 114 receives a selection of one or more triggers that are to be applied from the user. Alternatively, rather than selecting one or more triggers from a plurality of suggested triggers, the user may define their own triggers manually.

The triggers may be associated with a tag field of a record in a data table of database, such as a financial transaction, or an event not associated with a tag field. For example, a trigger may be identifying that a record has a particular tag or combination of tags. The triggers may relate to events pre-authorization, post-authorization, pre-settlement or post-settlement with respect to a financial transaction. Example triggers include bill issuances, bill payments, credit card payment due dates, load payments, tax payments installment payments, service charge/fee due dates, service charge/fee payments, dividend payments, interest payments, interest charges, credit card statement issuance (date), bank account statement issuance (date), account transfer, etc.

At operation 506, the user is presented via the GUI of the financial application 286 with a plurality of actions that may be performed in response to a trigger. For each trigger selected by the user, one or more actions may be selected for automated execution in response to detection of the trigger. Each action may have one or both of a pre-trigger script and a post-trigger script.

At operation 508, the user is optionally prompted via the GUI of the financial application 286 to specify whether authorization is to be requested after detection of a trigger and before execution of an automated action. If input that authorization is not to be requested is received, automated actions are performed automatically in response to detection of a trigger. If input that authorization is to be requested is received, authorization will be requested after detection of a trigger and before execution of an automated action for all automated actions.

At operation 510, the selected triggers and the corresponding automated actions are stored by the data management device 114, for example, in the database 116 on a per user basis, optionally along with an authorization setting or parameter as to whether authorization is to be requested after detection of a trigger and before execution of an automated action.

Figure 6:
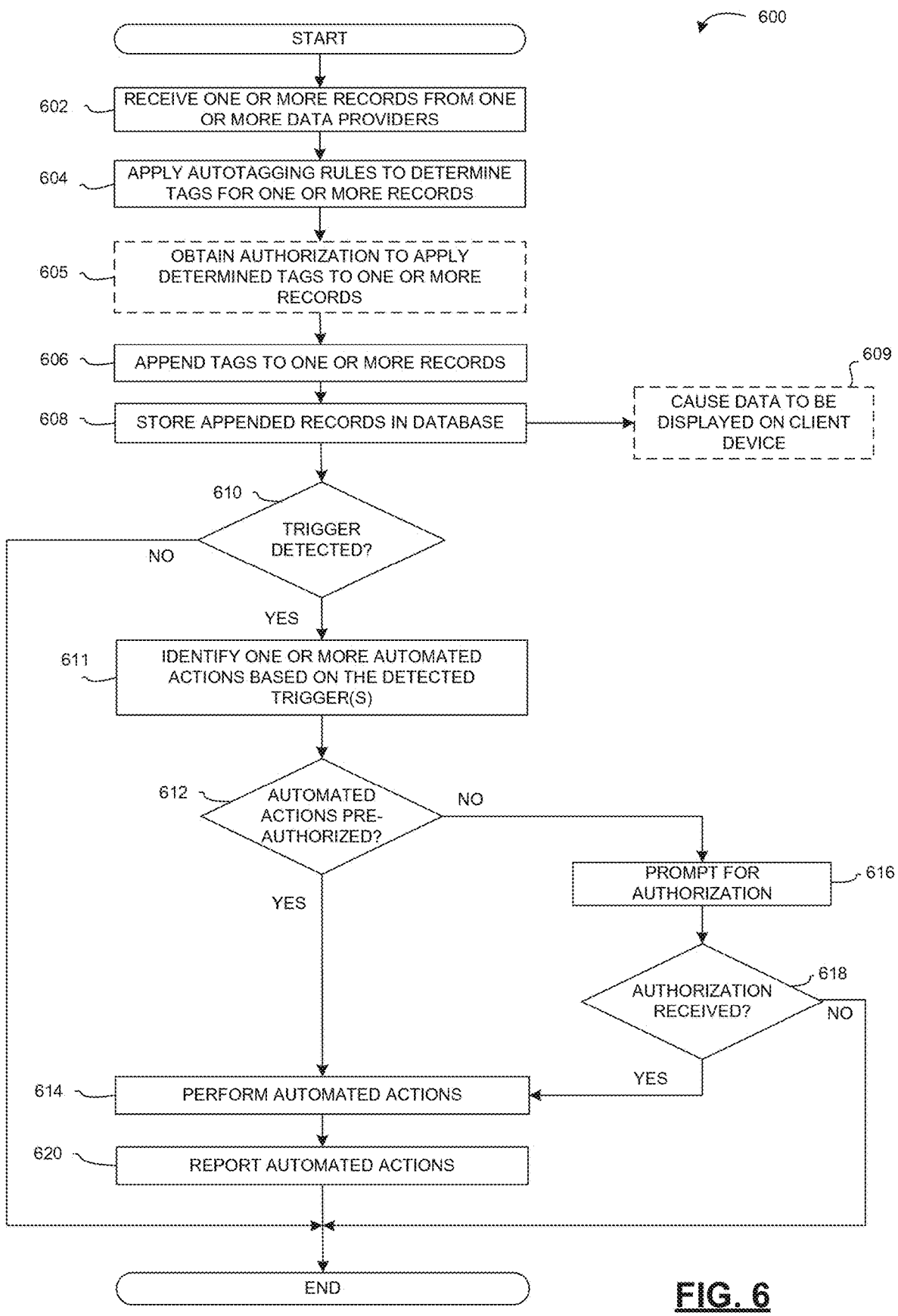
FIG. 6 is a flowchart illustrating an example method for a data management device of automatically tagging data in a data table in accordance with one example embodiment of the present disclosure.

Referring next to FIG. 6, a method 600 of automatically tagging data in a data table by a data management device 114 and optionally triggering automated actions in accordance with one example embodiment of the present disclosure will be described. At operation 602, the data management device 114 receives one or more records of the data table from a first data provider 120. The records may be one or more financial transaction records. Each record comprises a plurality of fields. The plurality of fields each has a value set by the first data provider 120. The first data provider 120 may be, for example, a debit card payment system 122, credit card payment system 124, investment brokerage system 126, financial institution 128, transaction processor 130, or online banking system 132. In other embodiments, the data management device 114 comprises the online banking system 132.

The data table is associated with an account having one or more authorized users. In some examples, the account is a bank account of a financial institution 128 or credit card account issued by a financial institution 128 and the authorized users are account holders for a which a transaction card may be been issued by an associated financial institution (referred to as "cardholders"). When the account is a bank account of a financial institution 128, the records are financial transaction records and may be either a deposit or withdrawal. When the account is a credit card account issued by a financial institution 128, the records are financial transaction records and may be either a debit or credit. In other examples, the account is an investment account of an investment brokerage, which may be associated with a financial institution 128, and the records may be a securities purchase, securities sale, dividend, funds contribution, funds withdrawal, service charge/fee, tax withholding, etc. The term "securities" includes debt securities (e.g., banknotes, bonds and debentures), equity securities (e.g., common stocks) and derivatives (e.g., forwards, futures, options and swaps).

The receiving operation 602 may but need not occur although an authorized user is online (i.e., logged in to the data management device 114). The trigger for the receiving operation 602 may be the occurrence of a financial transaction in connection with the associated account, such as a debit card transaction or a credit card transaction. The financial transaction may be performed in-person by an authorized user (e.g., cardholder) using a transaction card, an online banking transaction, an online purchase from a merchant 150, or other type of withdrawal from an associated bank account, deposit to an associated bank account, debit to an associated credit card account, or credit to an associated credit card account. When the one or more records include financial transaction records, the plurality of fields of the one or more records may comprise at least two of a date field, a time field, a merchant ID field, an amount field, and a user ID field.

At operation 604, the data management device 114 applies a plurality of predetermined autotagging rules to determine one or more tags for the one or more records in accordance with the predetermined autotagging rules based on one or more of the plurality of fields of the record. For example, the rule may be to tag a record with particular tag if the merchant ID field includes a predetermined value from among a plurality of potential values and the amount field meets predetermined criteria. For example, the rule may specify that if merchant ID field includes McDonalds™ or Taco Bell™ and the amount field is less than $20, tag the record as lunch. A time field may also be used in other examples, for example, to better differentiate between meal expenses based on the time of day.

The predetermined autotagging rules may include heuristic rules learned from user behavior, rules defined by users, or a combination thereof. In some examples, the autotagging rules may be determined by a neural network based on user behavior using, for example, reinforcement learning techniques, as described above. The plurality of predetermined autotagging rules are defined on per user basis. This allows the predetermined autotagging rules that are applied to be selected by the user, allowing the user to enable and disable autotagging rules as desired, regardless of whether the rule was learned or user-defined.

The plurality of autotagging rules may be pre-authorized by an authorized user of the account, for example, during setup or configuration as described above. Alternatively, in optional operation 605 the data management device 114 may obtain authorization to apply determined tags to one or more records before applying the plurality of autotagging rules. This may comprise sending a list of the one or more tags to a client device 110 for display thereon, and prompting the client device 110 for confirmatory input confirming the one or more tags identified by the data management device 114. The records are appended to include the one or more tag fields corresponding to the one or more tags only if the confirmatory input is received from the client device 110.

In some examples, the data management device 114 may access additional information associated with the account from the data provider 120. The additional information may comprise one or more of an authorized user (e.g., cardholder) associated with the respective transaction(s), an account type, an account sub-type, account name, an amount, a current account balance, an available account balance, a credit limit, a transaction limit, a transaction type, a time range, a date range, a merchant, a statement due date, or a bill due date. Alternatively, some of the additional information may be provided by the user, for example, account nicknames and other preferences set by a user may override or replace the values of one or more types of additional information provided by the data provides including but not limited to account types, account sub-types, account name. transaction limit and merchant names.

In some examples, the data management device 114 may receive supplemental data associated with the one or more records of the respective transactions from a supplemental data provider 142, and the one or more records are appended to include one or more further fields corresponding to the supplemental data. The supplemental data may be associated (linked) with the one or more records of the respective transactions using an identifier, such as invoice number or sales order number, among other possibilities. The autotagging rules may be based on one or more of the further fields as well as the one or more of the plurality of fields of the records. When the records include financial transactions, the supplemental data may be contextual information about the respective transaction(s).

In some examples, the supplemental data comprises a geo-location of a store location of a merchant 150 associated with the respective transaction(s). Accordingly, in some examples the supplemental data comprises a geo-location and the one or more further fields comprise a location field. For example, the supplemental data provider 142 may be a location service provider or mapping location provider that provides the store location of the merchant 150 associated with the respective transaction(s), which is then appended to the one or more records. The location information may include one or more of Global Navigation Satellite System (GNSS) coordinates (e.g., Latitude and Longitude in DMS (degree minute seconds), degrees decimal minutes (DDM) or decimal degrees (DD)), a link (e.g., Uniform Resource Locator (URL)) to map of the store location of the merchant 150 associated with the respective transaction(s), or directions to the store location of the merchant 150 associated with the respective transaction(s).

In other examples, the supplemental data comprises other information about the merchant, such as a description of the merchant 150 from a merchant directory or other data repository, or a URL to a webpage of the merchant 150, such as an online store, website, Facebook™ or Instagram™ page.

In other examples, the supplemental data comprises purchase description as an item that was purchased in the transaction or a combination of items purchased. The purchase description may comprise an item description, receipt, travel itinerary or other information about the products and/or services purchased in a transaction, which may be provided by the merchant 150 or other data source. Alternatively, the purchase information may be included in the records of the first data provider, e.g. debit card payment system 122, credit card payment system 124, investment brokerage system 126, financial institution 128, transaction processor 130, or online banking system 132.

In yet other examples, the supplemental data comprises information about the user or an external event, which may be determined from a calendar event in a calendar application of the supplemental data provider 142.

The plurality of autotagging rules may provide contextual tagging of transaction records based on any one or more of the fields of the transaction record, transaction history (e.g., transaction records) associated with the user or account such as a combination of transactions, additional information associated with the account, or supplemental data associated with the respective transaction. In some examples, the tagging of transaction records may be based on any one or combination of the following conditions: a time range; a geo-location; merchant; an external event; a user associated with a respective transaction (e.g., whether the user is approved for purchasing, for example, a child); a transaction description such as an item that was purchased; or a combination of transaction descriptions such as a combination of items purchased.

An example of how a combination of transactions may be used to create a tag will now be described. For example, a tag called "Child's Spending" may be applied to all transaction associated with a particular user ID, such as a particular card number. As another example, any spending associated with a geo-location within a geo-fence defined around the child's school or a geo-fence around a shopping mall frequented by the child may be automatically tagged with the tag "Child's Spending". A geo-fence is a virtual perimeter defined by a particular geographic area using geo-spatial coordinates, such as Latitude and Longitude, used by the satellite receiver 232. A geo-fence may be fixed or dynamically generated, for example, a radius around a particular point location. The geo-fence may be a predefined set of boundaries, or may be a set of zones or areas which need not be adjacent. Alternatively, the criteria may be any spending associated with a geo-location within a threshold distance of a geo-location of the child's school or shopping mall rather than a geo-fence. In yet another example, both the user ID and geo-location may be used to determine whether to tag transactions spending associated with the tag "Child's Spending". The autotagging rule may perform a calculation (e.g., summation) based on the amounts associated with all transactions having the same tag (e.g., "Child's Spending") within a predetermined time frame (e.g., calendar month), and trigger an automated action when predetermined criteria are met (e.g., when the total (sum) exceeds a threshold amount (e.g., $100)). The automated action may be a transfer of funds from a designated one of the user's accounts to an account of the user's child, the account number of the user's child being be linked to the particular card number using the account mapping information stored by, or provided to, the data management device 114 and/or data provider 120. Alternatively, the automated action may be to reject authorization and/or settlement of future transactions associated with the particular card number of the child for a predetermined duration of time.

Tags may be descriptive, examples include advertising, ATM/cash withdrawals, automotive expenses, business miscellaneous, cable/satellite services, charitable giving, cheques, child/dependent expenses, clothing/shoes, dues and subscriptions, education, electronics, entertainment, gasoline/fuel, general merchandise, gifts, groceries, healthcare/medical, hobbies, home improvements, home maintenance, insurance, loans, mortgages, office maintenance, office supplies, online services, other bills, other expenses, personal care, pets/pet care, postage and shipping, printing, rent, restaurants/dining service charges/fees, taxes, telephone services, travel, utilities, wages paid, and uncategorized. Tags may be based on type, examples include business or personal. The tags may be contextual in nature.

At operation 606, the data management device 114 appends the one or more records to include one or more tag fields corresponding to the determined one or more tags for the one or more records.

At operation 608, the data management device 114 stores the appended records in the database 116, for example, in a transaction database in the database 116.

At operation 609, the data management device 114 optionally sends instructions to a client device 110 to display at least some information for the plurality of records on a display of the client device 110 (e.g., touchscreen 234). The instructions cause at least some information for the plurality of records to be displayed on the display of the client device 110. The instructions to send the information may be triggered when an authorized user accesses the financial application 286 and requests transaction information. For example, the transaction information may be displayed on the client device 110 when the user requests recent banking account or credit card transactions on an accounts page of the financial application 286, or when the user requests a financial analysis of recent transactions from a financial analysis tool of the financial application 286.

When displaying the transaction information on the client device 110, the one or more tags for each of the plurality of records are displayed proximate to the information for the plurality of records. The tags may be displayed using any suitable presentation schemes. For example, the tags may be displayed via a unique text label and/or unique flag, marker or icon corresponding to the tag in one or more columns of a row corresponding to the respective transaction record. The flag, marker or icon may uniquely identify the respective tag using unique colors, images or graphics. Examples of displayed information of a bank account and credit card account are provided below for purposes of explanation. In the shown examples, the tag descriptor is a text label and appears in a column labelled "Category". In Table 1, the tags are based on an item purchased whereas in Table 2 the tags are based on the nature of the expense, e.g. whether business or personal.

TABLE 1

Example bank account information

Transactions
As of Sep. 25, 2017

| Date | Description | Withdrawal | Deposit | Balance | Category |
|---|---|---|---|---|---|
| Sep. 25, 2017 | NAOMI'S BOOKS TORONTO, ONTARIO | $112.16 | | $875.73 | Books |
| Sep. 25, 2017 | BRIDGET'S BITES, TORONTO, ONTARIO | $512.11 | | | Fast Food |
| Sep. 23, 2017 | VESPER'S ART SHOP TORONTO, ONTARIO | $424.09 | | $1,500.00 | Art |

TABLE 2

Example credit card account information

Transactions
As of Sep. 25, 2017

| Date | Description | Debit | Credit | Category |
|---|---|---|---|---|
| Sep. 25, 2017 | MOVIES 'R US TORONTO, ONTARIO | $12.20 | | Personal |
| Sep. 25, 2017 | AIRFARE PLUS TORONTO, ONTARIO | | $1,976.08 | Business |

It will be appreciated that only a subset of the data in the transactions records may be sent to the client device 110 and displayed. Some of the information in the records is used by the data management device 114 in determining tags and/or automated actions but are not shared with users. Some information is not shared with users to avoid cluttering the GUI with unnecessary or unimportant transaction information or because the information is confidential or proprietary, among other reasons. The data stored in the database 116 and information displayed on the client device 110 is derived from the records of one or more data providers, as described above. For example, the description field in Tables 1 and 2 shown above may be derived from a merchant ID field of the transaction records provided by the debit card payment system 122 or credit card payment system 124.

At operation 610, the data management device 114 applies one or more trigger rules to detect and identify any triggers based on one or more tag fields of one or more of the plurality of records in the database 116. The data management device 114 may monitor or "listen" for a plurality of triggers such as changes in the records of the database 116 (e.g., changes in one or more particular fields of records of the relevant accounts), third party listeners may monitor for changes in the records of one or more data providers 120, or a combination thereof. Thus, the data management device 114 may cooperate with third party listeners to detect trigger events occurring on the data providers 120.

At operation 611, when a trigger has been detected, the data management device 114 identifies one or more automated actions associated with the detected trigger.

At operation 612, the data management device 114 determines whether the identified automated actions are pre-authorized. At operation 614, when the identified automated actions are pre-authorized, the data management device 114 triggers the performance of the automated actions, for example, by requesting the automated actions be performed by an agent, such as one of the data providers 120, or by the data management device 114 initiating the automated actions. As used herein, the term "agent" refers to any device, script, software or the like that performs an action in response to instructions from the data management device 114.

Example automated actions include adding auxiliary tags (or secondary tags) based on other tags (sometimes known as primary tags), causing bill payments, portfolio rebalancing in relation to the holdings of an investment account, the initiation or termination/cancellation of other financial transactions, or determining whether to authorize and/or settle a financial transaction (such as a credit card transaction or debit card transaction), booking travel and/or accommodations using a preferred application or web service in accordance with preferred settings such as preference hotel and other accommodation providers and preferred travel providers, generating, autocompleting and submitting an expense form, retrieving a coupon from a merchant 150, submitting a comment or review to a social media site such as Facebook™ or Instagram™, obtaining a map and/or directions to a store location associated with a merchant 150, and obtaining additional information about the merchant and/or products/services offered by the merchant 150.

In some examples, the automated actions comprise determining by the data management device 114 one or more auxiliary tags for the one or more records based on one or more of tag fields for one or more records in accordance with the plurality of autotagging rules. Thus, tags may be added based on other tags. Tags may be defined in a hierarchy, thereby facilitating automatic multi-layer tagging. Tags in subsequent layers may be based on one or more multiple dependencies to tags in one or more previous layers. When more auxiliary tags for the one or more records are determined, the corresponding records are appended by the data management device 114 to the include one or more auxiliary tag fields in accordance with the one or more auxiliary tags, and stored by the data management device 114 in database 116.

In some examples, the one or more automated actions comprises generating an instruction for a transaction processor, such as a financial institution 128 or transaction processor 130, based on one or more of the plurality of fields of the respective records, and sending the instruction to the transaction processor. The automated action may be triggered pre-authorization, post-authorization, pre-settlement or post-settlement. In some examples, the records include transaction records each having a status. When the status of a transaction record is pre-authorization, the instruction may instruct the transaction processor whether to authorize the associated transaction. When the status of a transaction record is pre-settlement, the instruction may instruct the transaction processor whether to settle the associated transaction. In some examples, when the status of a transaction record is post-authorization or post-settlement, the instruction may instruct the transaction processor to initialize one or more transactions in relation to the account or one or more related accounts in dependence on the associated transaction.

The automated actions may be performed by an approved third party application separate from the data management device 114 using an application programming interface (API) for intermediating communication between the data management device 114 and an approved service provider of the approved third party application.

At operation 620, when an automated action is performed by an agent, the automated action is reported to the data management device 114 and possibly one or more of the data providers 120 when successful completed an agent performed. When an automated action is performed by the data management device 114, the automated action is reported by the data management device 114 to one or more of the data providers 120. The reporting may comprises generating one or more new records for the automated action.

At operation 616, when the identified automated actions are not pre-authorized, the data management device 114 prompts a client device 110 associated with the user for authorization to trigger the performance of the automated actions. At operation 618, when input confirming the automated actions is received by the data management device 114, operations proceed to operation 614, at which the data management device 114 triggers the performance of the automated actions.

In some examples, the data management device 114 sends a list of the automated actions to a client device 110 for display thereon. The client device 110 then displays the list of the automated actions, for example, on the touchscreen 234. The data management device 114 prompts the client device 110 for confirmatory input confirming the automated actions be performed. The automated actions are only performed if the confirmatory input is received. The prompt may be provided contemporaneously with the list data management device 114. The prompt may take the form of a simple dialog box or menu with menu options, i.e. buttons to perform or not to perform the automated actions. The prompt and confirmatory input may be based on entire group of automated actions in the list of automated actions or based on individual automated actions, i.e. each of the automated actions may be individually authorized.

Although the above-described embodiment describes determining whether the one or more automated actions are pre-authorized, these operations may be omitted in other embodiments, allowing all automated actions identified by the data management device 114 to be triggered automatically upon detecting of the corresponding trigger. Alternatively, the selection of a trigger and one or more corresponding actions by the user may be taken as deemed consent without requiring explicit user authorization.

Figure 7:
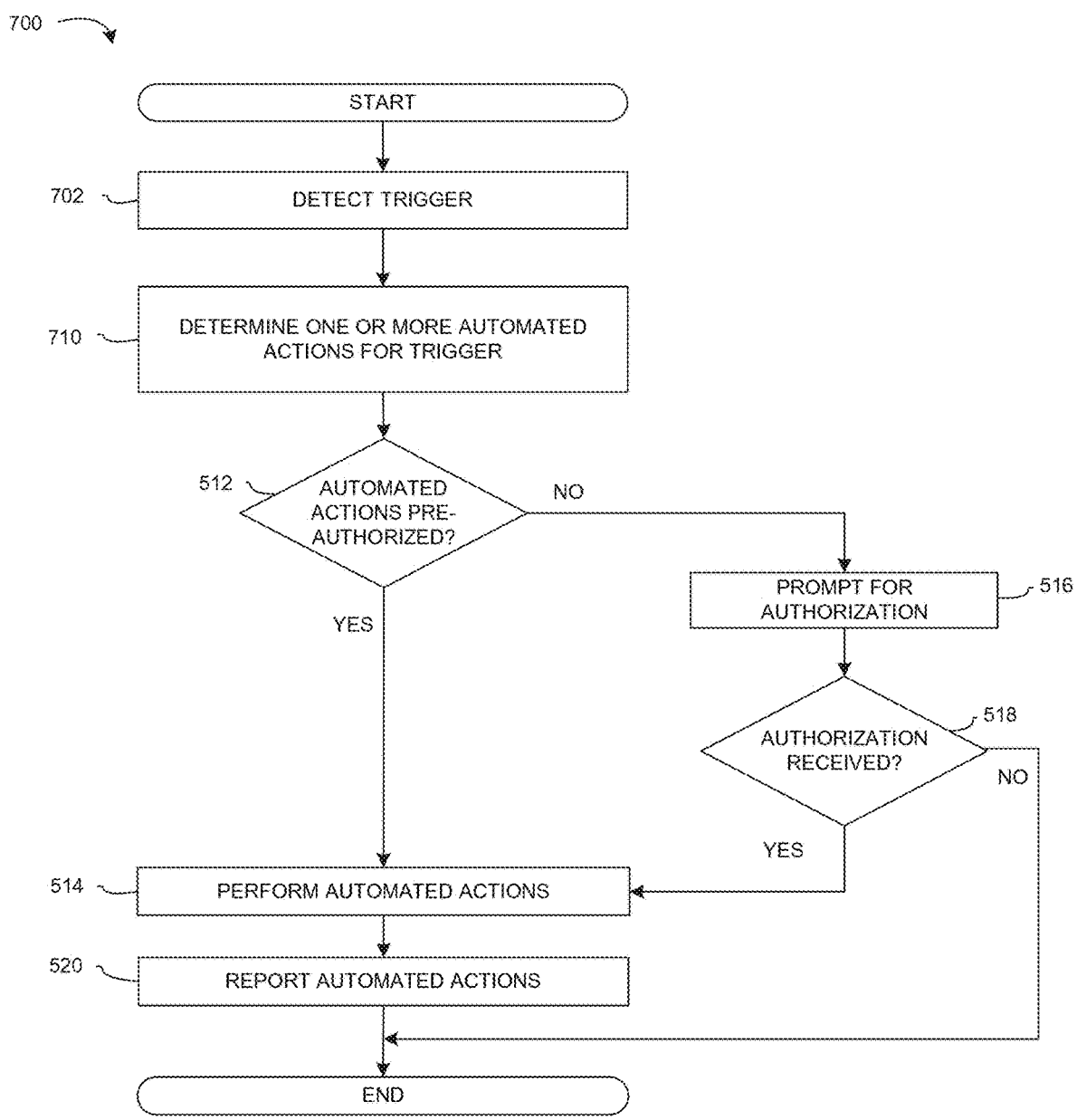
FIG. 7 is a flowchart illustrating an example method for a data management device of automatically triggering automated actions in accordance with one example embodiment of the present disclosure.

Referring next to FIG. 7, a method 700 of automatically triggering automated actions in accordance with one example embodiment of the present disclosure will be described. At operation 702, the data management device 114 detects a trigger for an automated action based on one or more trigger rules and one or more trigger conditions. The triggers may be based on any one or a combination of a value of one or more fields of one or more transaction records in a data table of a database 116, transaction history (e.g., transaction records) associated with the user or account, additional information associated with the account, or supplemental data associated with the respective transaction, or other events. Tag fields may or may not be considered. As noted above, the additional information may comprise one or more of an authorized user (e.g., cardholder) associated with the respective transaction(s), an account type, an account sub-type, account name, an amount, a current account balance, an available account balance, a credit limit, a transaction limit, a transaction type, a time range, a date range, a merchant, a statement due date, or a bill due date.

As noted above, the triggers for performing one or more automated actions may be based on one or a combination of tags, as defined by respective tag fields of a record in a data table of database 116. For example, the tag of "Child's Spending" may be applied to all transactions of a bank account or credit card account associated with a particular user ID, such as a particular card number, and a tag of "Fast Food" may be applied when the value of a merchant ID field matches a fast food restaurant name or other ID whereas a tag of "Bar" may be applied when the value of a merchant ID field matches a bar, pub, dance club or similar establishment. The tagging of a record with the tags "Child's Spending" and either "Fast Food" or "Bar" may trigger the automatic generation and sending of an electronic message to a particular user at a predetermined contact address, such as an email or text message to a predetermined email address or mobile telephone number. The electronic message may be a spending reminder or a dietary reminder from a parent to a child. The content of the electronic message may be fixed and set in advance by another authorizer user (e.g., primary user/parent) and sent automatically by without user input. Alternatively, a draft electronic message may be generated with content prepopulated from a template and displayed on the display of the client device 110 using, for example, an messaging application or client on the client device 110. The other authorizer user may be able to edit the content of the draft message using the messaging application or client, and may be required to confirm that the electronic message should be sent in its original or edited form before it is sent.

The data management device 114 may monitor or "listen" for a plurality of triggers such as changes in the records of the database 116 (e.g., changes in one or more particular fields of records of the relevant accounts), third party listeners may monitor for changes in the records of one or more data providers 120, or a combination thereof. Thus, the data management device 114 may cooperate with third party listeners to detect trigger events occurring on the data providers 120.

The triggers may be pre-authorization, post-authorization, pre-settlement or post-settlement with respect to a financial transaction. Example triggers include bill issuances, bill payments, credit card payment due dates, load payments, tax payments installment payments, service charge/fee due dates, service charge/fee payments, dividend payments, interest payments, interest charges, credit card statement issuance (date), bank account statement issuance (date), account transfer, etc.

At operation 710, the data management device 114 identifies one or more automated actions for the detected trigger. Examples of automated actions are described above in connection with the method 600 and FIG. 6.

Next, the data management device 114 causes performance of the one or more automated actions for the detected trigger in accordance with operations 612 to 620 of the method 600 described above.

Although the methods 600 and 700 have been described are being performed by the data management device 114, the operations may alternatively, be performed at least in part by a client device 110 such as a mobile wireless communication device 200 based on data provided by the data management device 114. Thus, tagging and triggering automated actions may be performed by the client device 200 as well as the data management device 114, depending on the embodiment.

Example Use Cases

Example use cases illustrating some of the teachings of the present disclosure will now be described. In accordance with one example, airfare is purchased during business hours (e.g., Monday to Friday, 9 AM to 5 PM) using a credit card. The purchase is determined by the data management device 114 relates to airfare based at least on the value of a merchant ID field in the transaction record received from the credit card payment system 124 and/or merchant 150.

A purchase description may also be considered when determining that the purchase relates to airfare. The purchase description may be provided by a value of a purchase description field of the transaction record received from the credit card payment system 124 and/or merchant 150. The amount also be considered when determining that the purchase relates to airfare. The amount is determined based on a value of an amount field of the transaction record received from the credit card payment system 124 and/or merchant 150. The data management device 114 determines that the record matches a tagging rule for "airfare", appends the tag "airfare" in a new primary tag field of the corresponding transaction record, and stores the appended transaction record in the database 116 in the data table for the credit card account.

A time of the transaction may be determined directly from a time field in of the transaction record received from the credit card payment system 124 and/or merchant 150, or indirectly from a time at which the transaction record was posted by the credit card payment system 124. The time is used by the data management device 114 to determine that the transaction occurred during business hours.

The data management device 114 then determines that the transaction record matches a tagging rule for "business expense" because the transaction record has a primary tag of "airfare" and the transaction occurred during business hours, appends the tag "business expense" in a new secondary field of the corresponding transaction record, and stores the appended transaction record in the database 116 in the data table for the credit card account.

Alternatively, the airfare may be determined to be a "business expense" based on additional information about the account, such as the credit card account being a business account. The account be designated a business account or business travel expenses account, for example by the user, and each new record created for that account acts as trigger account.

Because the transaction record has been tagged as a business expense, which is predetermined trigger, one or more actions for transaction records tagged as a business are performed. The actions may include automatically reserving a preferred hotel in the area of business travel, wherein the preferred hotel is stored preference in the financial application 286 or the data management device 114, and the area of business travel is determined from supplemental data relating to the transaction record, such as a travel itinerary obtained from a supplemental data provider 142 or merchant 150.

The actions may also include triggering a dynamic trigger that categorizes anything within the dates of travel, as determined from the travel itinerary or a calendar of a calendar application, as a business expense.

In accordance with another example, a purchase is made a restaurant in an airport during a time range at which the user is travelling for business. The user may be determined to be travelling for business, for example, using a travel itinerary or calendar of a calendar application as described above. The restaurant may be determined to be an airport based on a geo-location, which may be provided by the supplemental data provider 142 or merchant 150 or other means. The data management device 114 determines that the record matches a tagging rule for "business expense" or more specifically a "travel expense", appends the tag in a new primary tag field of the corresponding transaction record, and stores the appended transaction record in the database 116 in the data table for the credit card account.

Because the transaction record has been tagged as a business expense, which is predetermined trigger, one or more actions for transaction records tagged as a business are performed. The actions may comprise generating an expense report. An expense application, for example an accounting application, on a mobile wireless communication device may be called by the finance application 286 using an API. The expense application then auto-completes an expense form using the corresponding the data from the transaction records, and optionally submits the expense form for approval.

In accordance with a further example, a purchase is made using a transaction card (e.g., debit card or credit card) belonging to a joint cardholder such as a child. The trigger event may be the user and optionally a transaction amount, and the action may be to authorize or reject the transaction based on the user and/or amount of the transaction.

In accordance with yet a further example, a trigger-action combination may comprise a trigger comprising detection of a transaction below a threshold amount, and an action of authorizing or setting the transaction. This trigger-action combination allows any transaction below a threshold amount to be automatically authorized or settled. Alternatively, the trigger-action combination may be limited to particular accounts or merchants.

In accordance with yet a further example, the trigger-action combination may comprise a trigger comprising detection of a bill (or invoice) below a threshold amount, and an action of payment of the bill. This trigger-action combination allows any bill below a threshold amount to be automatically paid. Alternatively, the trigger-action combination may be limited to particular accounts or merchants.

In accordance with yet a further example, a trigger-action combination may be used to authorize or reject transactions based on a variety of criteria. In yet a further example, a trigger-action combination may be used to perform one or more actions before and/or after authorizing a transaction or rejecting a transaction.

Although the present disclosure describes the methods for tagging data in a data table and triggering automated actions as occurring primarily on the data management device 114, some or all of the processing may be performed on the client device 110 in other embodiments. Adaptation of the above-described methods so that some or all of the processing is performed on the client device 110 will be understood to the skilled person with knowledge of client-server software architecture. For example, for at least some of the operations to be performed on the client device 110, the data management device 114 may need to transmitted underlying data to the client device 110 so that the requisite data determination and processing steps may be performed.

General

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data management device. The terms "software" and "firmware" are interchangeable within the present disclosure and include any computer program stored in memory for execution by a processor, including RAM memory, ROM memory, erasable programmable ROM (EPROM) memory, electrically EPROM (EEPROM) memory, and non-volatile RAM (NVRAM) memory. The above memory types are example only, and are thus not limiting as to the types of memory usable for storage of a computer program. The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a data management device) to execute examples of the methods disclosed herein.

The term "processor" may include any programmable system including systems using micro- or nano-processors/controllers, reduced instruction set circuits (RISC), application specific integrated circuits (ASICs), logic circuits, and any other circuit or processor capable of executing the functions described herein. The term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A data management device, comprising:
a processor;
a memory coupled to the processor, the processor having stored hereon instructions that, when executed by the processor, cause the data management device to:
receive from a first data provider one or more records of a data table, each record comprising a plurality of fields, wherein the plurality of fields each has a value set by the first data provider, wherein the data table is associated with an account having one or more authorized users;
determine one or more tags for the one or more records in accordance with a plurality of autotagging rules, wherein the autotagging rules include heuristic rules learned from user behavior and based on one or more of the plurality of fields of the record;
append the one or more records to include one or more tag fields corresponding to the one or more tags for the one or more records; and
store the appended records in a database.

2. The data management device of claim 1, wherein the instructions, when executed by the processor, further cause the data management device to:
before appending by the data management device the one or more records to include the one or more tag fields corresponding to the one or more tags,
send a list of the one or more tags to a device for display thereon;
prompt the device for confirmatory input confirming the one or more tags; and
append the one or more records to include the one or more tag fields corresponding to the one or more tags only if the confirmatory input is received.

3. The data management device of claim 1, wherein the autotagging rules are defined on per user basis, and wherein the autotagging rules are pre-authorized by an authorized user of the account.

4. The data management device of claim 1, wherein the records include transaction records and the autotagging rules are based on one or more of the plurality of fields of the records and additional information associated with the respective transactions or the respective account, the additional information comprising one or more of an authorized user associated with the respective transactions, an account type, an amount, a current account balance, an available account balance, a credit limit, a transaction type, a time range, a date range, a merchant, statement due date, and a bill due date.

5. The data management device of claim 1, wherein the records include transaction records and the plurality of fields of the records comprises at least two of a date field, a time field, a merchant identifier (ID) field, an amount field, and a user ID field.

6. The data management device of claim 1, wherein the autotagging rules are determined by a neural network based on user behavior.

7. The data management device of claim 1, further comprising:
  receiving from a second data provider supplemental data associated with the one or more records; and
  appending the one or more records to include one or more further fields corresponding to the supplemental data;
  wherein the autotagging rules are based on one or more of the plurality of fields of the records and one or more of the further fields.

8. The data management device of claim 7, wherein the plurality of fields of the records comprises at least two of a date field, a merchant ID field, an amount field, and a user ID field, wherein the supplemental data comprises a geolocation and the one or more further fields comprise a location field.

9. The data management device of claim 1, wherein the instructions, when executed by the processor, further cause the data management device to:
  send instructions to a client device to display at least some information for the plurality of records on a display of the client device, wherein the instructions cause the at least some information for the plurality of records to be displayed on the display of the client device, wherein the one or more tags for each of the plurality of records are displayed proximate to the information for the plurality of records.

10. The data management device of claim 1, wherein the instructions, when executed by the processor, further cause the data management device to:
  cause performance of one or more automated actions based on one or more tag fields of one or more of the plurality of records.

11. The data management device of claim 10, wherein the instructions, when executed by the processor, cause the data management device to:
  before causing the performance of the one or more automated actions:
    identify the one or more automated actions in accordance with one or more trigger rules based on one or more tag fields of one or more of the plurality of records;
    send a list of the automated actions to a device for display thereon;
    prompt the device for confirmatory input confirming the automated actions; and
    cause the performance the one or more automated actions only if the confirmatory input is received.

12. The data management device of claim 10, wherein the instructions, when executed by the processor, further cause the data management device to:
  identify the one or more automated actions in accordance with one or more trigger rules based on one or more tag fields of one or more of the plurality of records; and
  determine whether the one or more automated actions are pre-authorized for the account,
  wherein the automated actions are performed automatically when the one or more automated actions are pre-authorized for the account.

13. The data management device of claim 10, wherein an automated action comprises:
  determining by the data management device one or more auxiliary tags for the one or more records based on one or more of tag fields for one or more records in accordance with the plurality of autotagging rules;
  appending by the data management device the one or more records to include one or more auxiliary tag fields in accordance with the one or more auxiliary tags; and
  storing by the data management device the appended records in the database.

14. The data management device of claim 10, wherein an automated action comprises:
  generating an instruction for a transaction processor based on one or more of the plurality of fields of the respective records; and
  sending the instruction to the transaction processor.

15. The data management device of claim 14, wherein the automated action is at least one of triggered pre-authorization, post-authorization, pre-settlement and post-settlement.

16. The data management device of claim 14, wherein the records include transaction records each having a status, when the status of a transaction record is pre-authorization, wherein the instruction instructs the transaction processor whether to authorize the associated transaction.

17. The data management device of claim 14, wherein the records include transaction records each having a status, when the status of a transaction record is pre-settlement, the instruction instructs the transaction processor whether to settle the associated transaction.

18. The data management device of claim 14, wherein the records include transaction records each having a status, when the status of a transaction record is post-authorization or post-settlement, the instruction instructs the transaction processor to initialize one or more transactions in relation to the account or one or more related accounts in dependence on the associated transaction.

19. The data management device of claim 10, wherein the one or more automated actions are caused to be performed by an approved third party application separate from the data management device using an application programming interface (API) for intermediating communication between the data management device and an approved service provider of the approved third party application.

20. A method of data management performed by a processor of a data management device, comprising:
  receiving from a first data provider one or more records of a data table, each record comprising a plurality of fields, wherein the plurality of fields each has a value set by the first data provider, wherein the data table is associated with an account having one or more authorized users;
  determining one or more tags for the one or more records in accordance with a plurality of autotagging rules, wherein the autotagging rules include heuristic rules learned from user behavior and based on one or more of the plurality of fields of the record;
  appending the one or more records to include one or more tag fields corresponding to the one or more tags for the one or more records; and
  storing the appended records in a database.

21. A non-transitory machine readable medium having tangibly stored thereon executable instructions for execution by a processor of a data management device, wherein the executable instructions, in response to execution by the processor of the data management device, cause the data management device to:
  receive from a first data provider one or more records of a data table, each record comprising a plurality of fields, wherein the plurality of fields each has a value set by the first data provider, wherein the data table is associated with an account having one or more authorized users;

determine one or more tags for the one or more records in accordance with a plurality of autotagging rules, wherein the autotagging rules include heuristic rules learned from user behavior and based on one or more of the plurality of fields of the record;

append the one or more records to include one or more tag fields corresponding to the one or more tags for the one or more records; and store the appended records in a database.

* * * * *